July 17, 1923.
W. F. KIESEL, JR
1,461,854
VALVE FOR POWER REVERSE GEARS
Filed Aug. 18, 1920
3 Sheets-Sheet 3
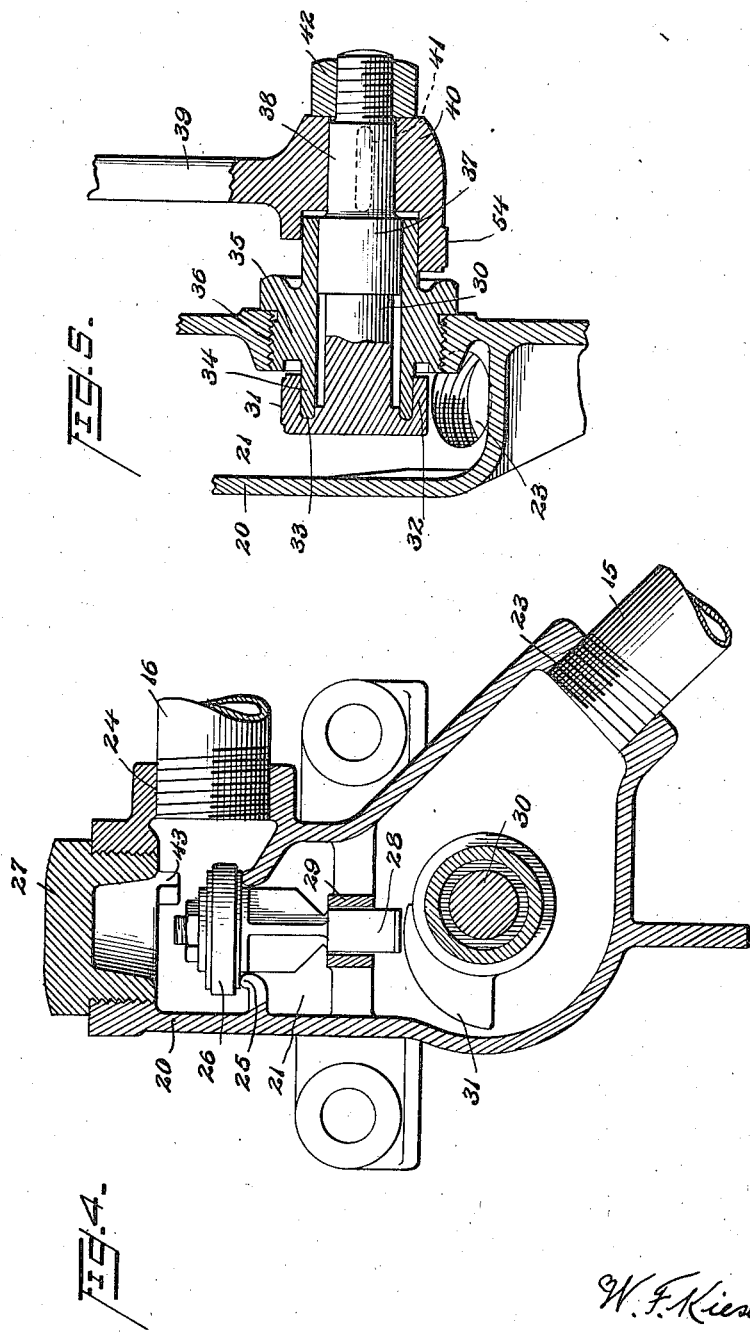

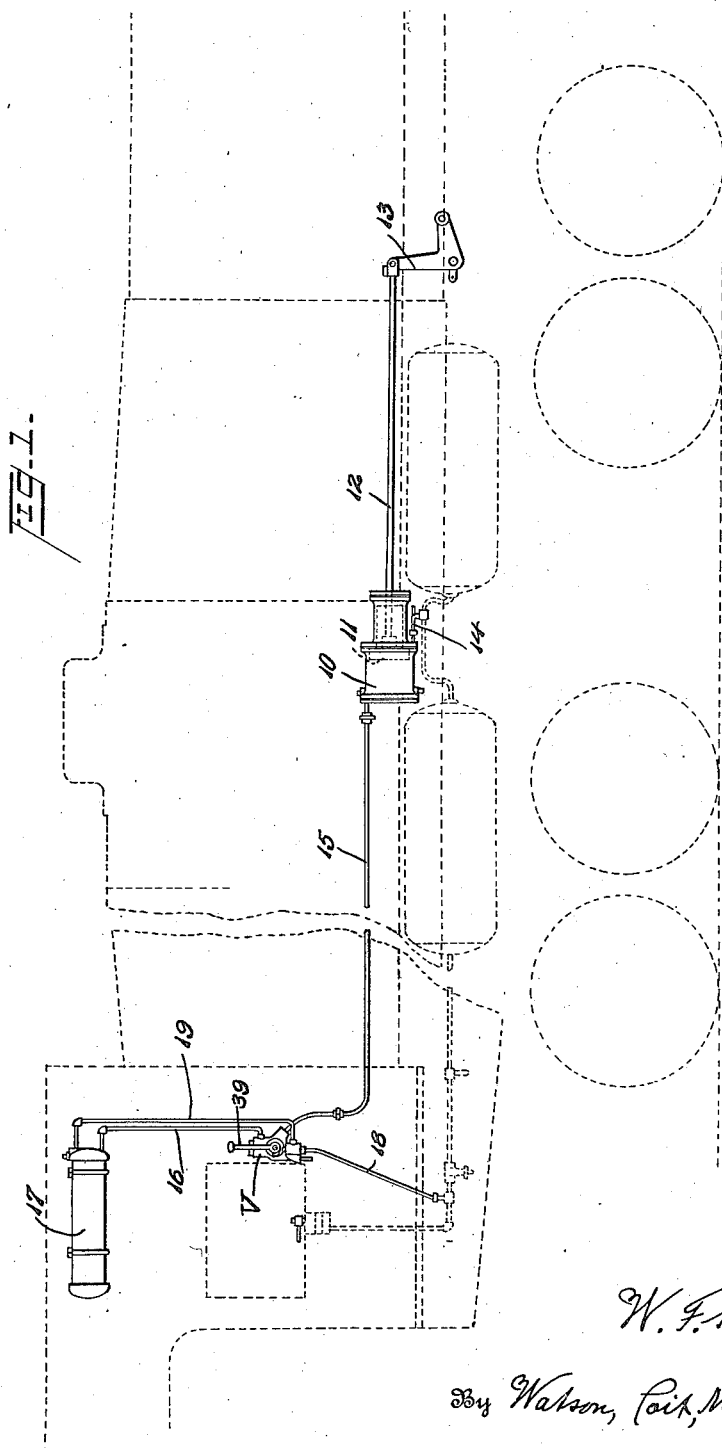

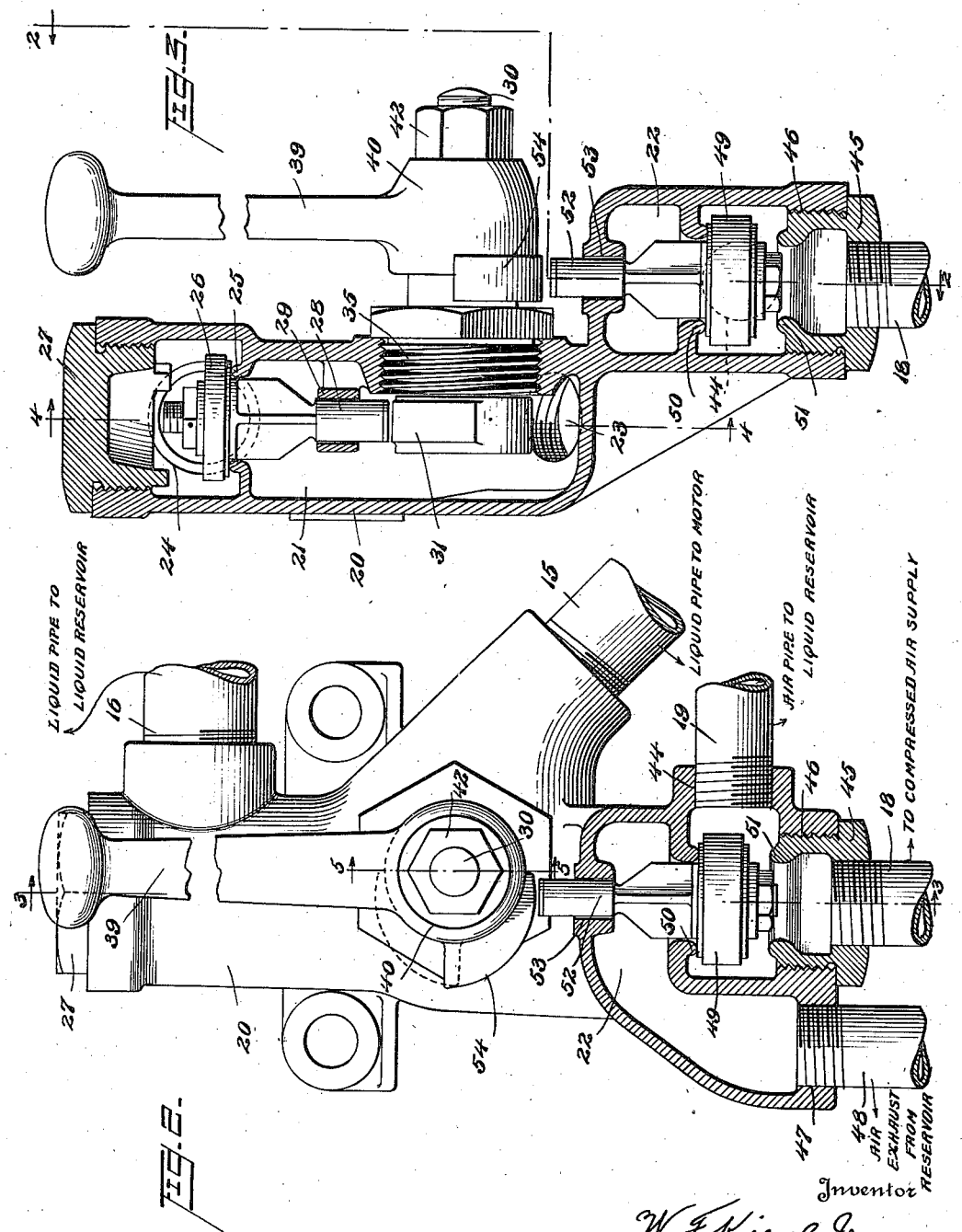

Patented July 17, 1923.

1,461,854

UNITED STATES PATENT OFFICE.

WILLIAM F. KIESEL, JR., OF ALTOONA, PENNSYLVANIA.

VALVE FOR POWER REVERSE GEARS.

Application filed August 18, 1920. Serial No. 404,374.

*To all whom it may concern:*

Be it known that I, WILLIAM F. KIESEL, Jr., a citizen of the United States, and residing at Altoona, Blair County, State of Pennsylvania, have invented certain new and useful Improvements in Valves for Power Reverse Gears, of which the following is a specification.

The present invention relates to valves and more particularly to valves for controlling the operation of a fluid motor.

In my application Serial No. 233,701 filed May 10, 1918, I have described and claimed an apparatus for actuating the reverse gear of a steam engine, more particularly a locomotive engine. The apparatus described in said application comprises a motor for operating the reverse gear and a valve for controlling the motor. The present invention is directed to an improved valve of the type described in said application.

The principal objects of the invention are to provide a simple, dependable valve of the type mentioned and one which is so constructed that the interior parts are easily accessible.

Other objects and features of novelty will be apparent from the description taken in connection with the drawings, in which—

Fig. 1 is a side elevation of an apparatus for actuating a reverse gear including a valve constructed in accordance with the present invention;

Fig. 2 is a front elevation of the valve, the lower portion thereof being in section on the line 2—2 of Fig. 3;

Fig. 3 is a sectional elevation taken substantially on the line 3—3 of Figure 2;

Fig. 4 is a sectional elevation taken substantially on the line 4—4 of Figure 3; and Fig. 5 is a sectional elevation taken substantially on the line 5—5 of Figure 2.

The general arrangement of the apparatus shown in Figure 1 is fully described in my aforementioned application. Briefly stated, however, it comprises a motor 10 having a piston 11 connected by a rod 12 to a bell crank 13 which in turn is adapted to actuate the reverse gear. The cylinder 10 on one side of the piston 11 is supplied with compressed air from the compressed air system of the locomotive by means of the pipe 14. Thus the piston 11 is always forced toward the left as viewed in Figure 1. This motion is resisted or overcome by means of liquid under pressure supplied to the other end of the cylinder through a liquid pipe 15. The flow of liquid in this pipe 15 is controlled by a valve V in the cab, which constitutes the subject matter of the present invention. Pipe 15 leads to this valve V and in accordance with the position of the valve may be placed in communication with a pipe 16 connected to the bottom of a liquid reservoir 17. For the purpose of putting the liquid in the reservoir 17 under pressure, the valve is connected by means of a pipe 18 to the compressed air system of the locomotive and the valve in turn is connected to the reservoir 17 by the air pipe 19 so that the liquid in the reservoir 17 is placed under pressure when compressed air is admitted thereto and released from pressure when the compressed air is exhausted therefrom.

In operation if the valve V is actuated in one direction, liquid under pressure is supplied through pipe 15 to the motor 10 to force the piston 11 toward the right, as viewed in Figure 1, it being understood that the liquid in reservoir 17 is subjected to the compressed air from the compressed air system of the locomotive. When it is desired to have the piston 11 move toward the left, as viewed in Figure 1, the valve is turned so as to cut off the supply of compressed air to the reservoir 17 and the compressed air in said reservoir is exhausted thereby reducing the pressure so that the air pressure on the right hand side of piston 11 overcomes the pressure on the other side and the piston moves toward the left.

Referring now to Figures 2 to 5 inclusive which illustrate the valve of the present invention, it will be seen that it comprises a body 20 having two noncommunicating chambers 21 and 22. One of these chambers as 21 has an inlet opening 23 in the wall of the body adapted to receive pipe 15 in communication with the cylinder of the motor. This chamber also has another opening 24 in the wall of the body which is in communication with the reservoir 17 through the pipe 16. Between the openings 23 and 24, the chamber has a valve seat 25 with which a poppet valve 26 cooperates to control the flow of liquid between the reservoir and the motor. It will be seen that the upper end of the valve body is open and said opening is of larger diameter than the diameter of the valve 26 so that said valve may be easily removed through said opening if desired. As shown, the opening is closed by a screw plug 27. For the purpose of guiding the valve 26 in its movements to and from the seat 25, it is provided with stem 28 reciprocating in a guide 29 carried by the body. The stem projects below said guide and is adapted to be acted on to raise the valve, it being understood that the valve is seated by the fluid pressure.

As shown, the means for actuating the poppet valve 26 comprises a rotatable device including a short shaft 30 having a cam 31 at its inner end disposed in the liquid chamber 21 in position to act on the lower end of the valve stem 28. This cam 31 is carried by a rim 32 spaced from the shaft 30, thus providing a bearing seat 33 for the inwardly extending flange 34 of a screw bushing 35 disposed in an opening 36 in the wall of the body. Another bearing for the shaft 30 is provided adjacent the outer end of said bushing by a cylindrical enlargement 37 on the shaft tightly fitted to the bore of said bushing. The shaft 30 projects axially outside the bushing and has a reduced portion 38 carrying an upright handle 39 whose hub 40 is secured to the shaft for rotation therewith in any suitable manner, as by means of the key 41. Axial displacement of the hub is prevented by a nut 42 screwed on the end of the shaft. The aforesaid structure for mounting the rotatable device provides a liquid tight joint. It will be seen when the handle 39 is turned in a clockwise direction, as viewed in Figure 2, the cam 31 will be turned in a direction to raise the valve 26 from its seat and permit liquid to flow from the reservoir to the motor. The extent of the opening movement of the valve 26 is limited by stops 43 on the bottom of screw plug 27.

The other chamber 22 of the valve body, which may be termed the air chamber to distinguish from the chamber just described, is adapted to be placed in communication with the liquid reservoir through an opening 44 in the wall of the body, the pipe 19 being screwed into this opening. The chamber is also adapted to be placed in communication with a supply of compressed air. For this purpose a hollow plug 45 is screwed into the opening 46 and the pipe 18 is screwed into the plug. An opening 47 is provided through which the air may be exhausted from the chamber, a short pipe 48 being screwed into this opening. For the purpose of controlling the flow of air through these various openings, a poppet valve 49 is provided adapted to cooperate with a seat in the chamber 22, this seat being provided between the openings 44 and 47. The valve 49 is also adapted to control the flow of fluid from the compressed air supply to the liquid reservoir, that is from pipe 18 to pipe 19. For this purpose the plug 45 is provided with a seat 51 spaced from and parallel to the seat 50 and said poppet valve 49 is adapted to cooperate with this seat as well as with the other. For the purpose of properly guiding the valve it is provided with a stem 52 projecting through an opening 53 in the top wall of the chamber 22. It will be observed that the air pressure from the compressed air supply will hold the valve 49 against seat 50 and thus the valve is normally in a position where the reservoir is in communication with the compressed air supply. For the purpose of cutting off this supply and exhausting the air from the reservoir, it is necessary to place pipe 19 in communication with pipe 48. This is accomplished by depressing the valve 49 away from seat 50 and against seat 51. As shown, the device for moving the poppet valve 49 comprises a cam 54, rotatable with the hub 40 of the actuating handle 39, this cam being in line so as to act on the upper end of the valve stem 52. From an inspection of the drawings it is seen that the axes of the two valves are parallel and the axis of the rotatable actuating device is parallel to the plane determined by the valve axes.

In operation when the handle 49 is turned toward the right, as viewed in Figure 2, the liquid valve 26 is opened, thereby placing the reservoir in communication with the motor 10 and forcing the piston 11 thereof toward the right, as viewed in Figure 1. The air valve 49 remains in the position illustrated in Figures 2 and 3 so that the compressed air is supplied to the reservoir. When the actuating handle is returned to the vertical position of Figure 2, the valves will be in the positions illustrated in Figure 3 and the supply of liquid to the motor will be cut off so that the piston 11 of the motor will be held against movement. If the actuating handle 39 is moved toward the left or counter clockwise, as viewed in Figure 2, the cam 54 will act on the upper end of the air valve stem to depress the air valve 49 into contact with the seat 51, thereby cutting off the supply of compressed air to the reservoir and placing pipe 19 in communication with exhaust pipe 48 so that the compressed air in the reservoir is exhausted therefrom. Thus as the pressure on the liquid in the reservoir is relieved, the air pressure acting on the right hand side of piston 11 of the motor will force the piston toward the left, as viewed in Figure 1, the flow of liquid opening the valve 26. Of course when air pressure is again introduced to the reservoir, the return movement of this liquid will be stopped, as the pressure will cause valve 26 to become seated.

Although a specific form of the invention has been described in detail, it is to be understood that the invention is not thus limited, but includes modifications and changes which come within the scope of the appended claims.

Having thus described the invention what is claimed as new and desired to be secured by Letters Patent is:

1. A device of the character described for controlling the operation of a motor adapted to actuate an engine reverse gear including in combination, a body, two valves therein, said body having inlet and discharge passages controlled by one valve, and inlet, discharge and exhaust passages controlled by the other valve and means to actuate said valves including a rotatable member having a cam for each valve.

2. A device of the character described including in combination, a body, two poppet valves therein, said body having inlet and discharge passages controlled by one valve, and inlet, discharge and exhaust passages controlled by the other valve and means to actuate said valves including a rotatable member having a cam for each valve.

3. A device of the character described including in combination, a body, two poppet valves therein, said body having inlet and discharge passages controlled by one valve, and inlet, discharge and exhaust passages controlled by the other valve and means to selectively operate said valves.

4. A device of the character described including in combination, a body, two poppet valves therein, said body having inlet and discharge passages controlled by one valve, and inlet, discharge and exhaust passages controlled by the other valve and means to selectively operate said valves including a rockable member, and an element secured to said member within said body, operable on one of said valves.

5. A device of the character described for controlling the operation of a motor adapted to actuate an engine reverse gear including in combination, a body having two non-communicating chambers, inlet and discharge openings for one chamber, a poppet valve controlling the same, the second chamber having inlet, discharge and exhaust openings, a second poppet valve controlling the last mentioned openings, the axes of said two valves being parallel, a rockable member extending through a wall of the body having means disposed within the body for operating one of said valves and means associated with said member to operate the other valve.

6. A device of the character described for controlling the operation of a motor adapted to actuate an engine reverse gear including in combination, a body having two non-communicating chambers, inlet and discharge openings for one chamber, a poppet valve controlling the same, the second chamber having inlet, discharge and exhaust openings, a second poppet valve controlling the last mentioned openings, the axes of said two valves being parallel, a rockable member extending through a wall of the body having means disposed within the body for operating one of said valves and means associated with said member outside said body to operate the other valve.

7. A device of the character described for controlling the operation of a motor adapted to actuate an engine reverse gear including in combination, a body having two non-communicating chambers, inlet and discharge openings for one chamber, a poppet valve controlling the same, the second chamber having inlet and discharge and exhaust openings, a second poppet valve controlling the last mentioned openings, the axes of said two valves being parallel, and one of the valves having a part projecting from the body, a rockable member extending through a wall of the body having means outside the body operable on said projecting part to actuate the valve, and means within the body to actuate the other valve.

8. A device of the character described for controlling the operation of a reverse gear operating motor including in combination, a valve body, having two non-communicating chambers, one chamber having two openings communicating therewith through the body wall, a poppet valve controlling flow of fluid through said openings seated by pressure, the other chamber having three openings communicating therewith through the body wall, a poppet valve adapted to place one opening in communication with either of the other two openings and held in one position by pressure, and rotatable means to selectively move said valve.

9. A device of the character described for controlling a reverse gear operating motor including in combination, a valve body having two non-communicating chambers, a valve seat in one of said chambers, two openings communicating with said chamber, one on each side of said seat, a poppet valve cooperating with said seat, said body having an opening of larger diameter than said valve aligned therewith through which the valve may be removed, a plug in said opening having a central passage therethrough and a seat parallel with the first seat with which the valve cooperates, the other chamber having openings in the body wall communicating therewith, a valve controlling the last mentioned openings, and rotatable means to selectively actuate said valves.

10. A device of the character described including in combination, a valve body having two non-communicating chambers, said body having openings in its wall in communication with said chambers, a poppet valve in each chamber controlling flow of fluid through said openings, a rotatable shaft extending through the wall of the body having a cam within the body operable on one valve, and a handle secured to said shaft said handle having a cam operable on the other valve.

In testimony whereof I affix my signature.

WILLIAM F. KIESEL, Jr.